(12) United States Patent
Johnson

(10) Patent No.: US 7,898,544 B2
(45) Date of Patent: *Mar. 1, 2011

(54) DETECTING CONNECTION TOPOLOGY IN A MULTI PROCESSOR GRAPHICS SYSTEM

(75) Inventor: Philip Browning Johnson, Campbell, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/502,333

(22) Filed: Jul. 14, 2009

(65) Prior Publication Data
US 2009/0273603 A1    Nov. 5, 2009

Related U.S. Application Data

(63) Continuation of application No. 11/305,701, filed on Dec. 16, 2005, now Pat. No. 7,561,163.

(51) Int. Cl.
G06F 15/16 (2006.01)
G06F 15/80 (2006.01)
G06F 13/14 (2006.01)
G06F 13/36 (2006.01)
G06F 13/40 (2006.01)

(52) U.S. Cl. ......... 345/502; 345/503; 345/504; 345/505; 345/519; 345/520; 710/305; 710/306; 710/307

(58) Field of Classification Search ................. None
See application file for complete search history.

(56) References Cited

U.S. PATENT DOCUMENTS 7,561,163 B1 *  7/2009  Johnson ................. 345/502
2003/0145258 A1 *  7/2003  Warner et al. ............ 714/704

* cited by examiner

*Primary Examiner* — Xiao M Wu
*Assistant Examiner* — Tize Ma
(74) *Attorney, Agent, or Firm* — Kilpatrick Townsend & Stockton LLP

(57) ABSTRACT

Multiple graphics processors in a graphics processing system are interconnected in a unidirectional or bidirectional ring topology, allowing pixels to transferred from any one graphics processor to any other graphics processor. The system can automatically identify one or more "master" graphics processors to which one or more monitors are connected and configures the links of the ring such that one or more other graphics processors can deliver pixels to the master graphics processor, facilitating distributed rendering operations. The system can also automatically detect the connections or lack thereof between the graphics processors.

9 Claims, 11 Drawing Sheets

DETECTING CONNECTION TOPOLOGY IN A MULTI PROCESSOR GRAPHICS SYSTEM

CROSS-REFERENCES TO RELATED APPLICATIONS

This application is a continuation of U.S. patent application Ser. No. 11/305,701, filed Dec. 16, 2005, was filed concurrently with the following related U.S. patent application, which are assigned to NVIDIA Corporation, the assignee of the present invention, and the disclosures of which are hereby incorporated by reference for all purposes:

U.S. patent application Ser. No. 11/305,580, entitled "Graphics Processing Systems with Multiple Processors Connected in a Ring Topology".

BACKGROUND OF THE INVENTION

The present invention relates in general to graphics processing systems, and in particular to detecting the connection topology in a graphics processing systems with multiple graphics processors that might or might not be interconnected.

Graphics subsystems are designed to render realistic animated images in real time, e.g., at 30 or more frames per second. These subsystems are most often implemented on expansion cards that can be inserted into appropriately configured slots on a motherboard of a computer system and generally include a dedicated graphics processing unit (GPU) and dedicated graphics memory. The typical GPU is a highly complex integrated circuit device optimized to perform graphics computations (e.g., matrix transformations, scan-conversion and/or other rasterization techniques, texture blending, etc.), write the resulting pixels to the graphics memory, and deliver the pixels in real time to a display device. The GPU operates in response to commands received from a driver program executing on a central processing unit (CPU) of the system.

To meet the demands for realism and speed, some GPUs include more transistors than typical CPUs. In addition, graphics memories have become quite large in order to improve speed by reducing traffic on the system bus; some graphics cards now include as much as 256 MB of memory. But despite these advances, a demand for even greater realism and faster rendering persists.

Consequently, some manufacturers have developed "multi-chip" graphics subsystems in which two or more GPUs, either on the same card or on two or more different cards, operate in parallel. Parallel operation substantially increases the number of rendering operations that can be carried out per second without requiring significant advances in GPU design. To minimize resource conflicts between the GPUs, each GPU is generally provided with its own dedicated memory area, including a display buffer to which the GPU writes pixel data it renders.

In a multi-chip system, two or more GPUs can be operated to render images cooperatively for the same display device; in this "distributed" rendering mode, rendering tasks are distributed among the GPUs. Tasks may be distributed in various ways. For example, in a "split frame rendering" mode, each GPU is instructed to render pixel data for a different portion of the displayable image, such as a number of lines of a raster-based display. The image is displayed by scanning out the pixel data from each GPU's display buffer and selecting a pixel generated by one or another of the GPUs depending on screen position. As another example, in an "alternate frame rendering" mode, each GPU is instructed to render pixel data for a different image in a temporal sequence (e.g., different frames of an animated image such as a 3D video game). In this mode, a smooth animation speed of about 30 frames per second can be provided by two GPUs that each render images at 15 Hz.

Existing display devices are generally configured to receive data for each screen pixel serially through one interface. Consequently, the multichip graphics system generally needs to route all of the pixel data to a single path for delivery. For instance, one GPU (referred to herein as a "master" GPU) might be connected to the monitor interface, with all other GPUs delivering their data to the master GPU via various communication paths that may include bus connections and/or dedicated point-to-point links between two GPUs.

Some multichip systems are created by interconnecting two or more single-chip graphics cards in a unidirectional daisy chain and connecting a monitor to one of the cards. If each card provides a connector for a monitor, it is not possible to identify a master GPU until the system is built and the monitor connected. For instance, if the user is confronted with two cards, each of which presents an identical monitor connector, the user might connect the monitor to either card. If the display is connected to a GPU that cannot receive data from another GPU, the benefits of having two GPUS may be lost. Further, as the number of GPUs and possible locations for monitor connections increases, the likelihood that the user will correctly identify the best location (i.e., the location at the receiving end of the daisy chain) to connect a monitor decreases.

In other multichip systems, two or more single-chip graphics cards are connected in a bidirectional daisy chain. If there are only two GPUs, either GPU can receive data from the other, and the user may connect a monitor to either card without losing the benefits of having two GPUs. If, however, there are more than two GPUs, the GPUs that are not at either end of the chain cannot operate as masters to all of the other GPUs. As in the unidirectional case, the likelihood that the user correctly identifies the best location to connect a monitor decreases with the number of GPUs.

It would therefore be desirable to provide multichip systems in which the GPUs can automatically be configured to support distributed rendering operations regardless of where a monitor is connected.

BRIEF SUMMARY OF THE INVENTION

Embodiments of the present invention provide graphics processing systems that automatically detect the connection topology among two or more graphics processors that might or might not be interconnected. A display head of a first graphics processor can be operated as a pixel source to generate a test pattern on an output port, with other graphics processors passing through pixel data received from an input port. If one of the other graphics processors is connected to the output port of the first graphics processor, the other graphics processor will also output the test pattern. By detecting which (if any) of the other graphics processors output the test pattern, the connectivity of the first graphics processor can be determined. In some embodiments, information about the connection topology can be used to configure links between the graphics processor; for instance, the graphics processing system can automatically identify one or more "master" graphics processors to which one or more monitors are connected, then configures the links of the ring such that one or more other graphics processors can deliver pixels to the master graphics processor.

According to an aspect of the present invention, a method for detecting connections between multiple graphics processors in a graphics subsystem includes operating a display head of a first one of the graphics processors to output a test pattern (e.g., a single pixel value that is repeatedly output) as pixel data on an input/output (I/O) port that is connectable to an I/O port of another one of the graphics processors. Concurrently with operating the display head of the first graphics processor, a display head of a second one of the graphics processors is operated in a pass through mode such that the display head of the second graphics processor outputs pixel data received via an I/O port of the second graphics processor. It is determined whether the display head of the second graphics processor outputs the test pattern while operating in the pass through mode, with a connection between the first graphics processor and the second graphics processor being detected is in the event that the display head of the second graphics processor outputs the test pattern while operating in the pass through mode.

In some embodiments where a third graphics processor is also present, a display head of a third one of the graphics processors may also be operated in the pass through mode such that the display head of the third graphics processor outputs pixel data received via an I/O port of the third graphics processor. It is determined whether the display head of the third graphics processor outputs the test pattern while operating in the pass through mode, with a connection between the first graphics processor and the third graphics processor being detected in the event that the display head of the third graphics processor outputs the test pattern while operating in the pass through mode. The second and third graphics processors are advantageously operated in the pass-through mode concurrently so that multiple possible connections can be tested in parallel.

In some embodiments, determining whether the display head of the second graphics processor outputs the test pattern while operating in the pass through mode includes operating a pattern detection circuit in the second graphics processor to compare the received pixel data to the test pattern. For instance, a checksum can be computed over at least a portion of the output pixel data of the second graphics processor, and the computed checksum can be compared to a test checksum corresponding to the test pattern.

Detected connections can be unidirectional or bidirectional. In some embodiments, all connections are bidirectional; in other embodiments, all connections are unidirectional; and in still other embodiments, when a connection between the first graphics processor and the second graphics processor is detected, a further test is performed to determine whether the connection is unidirectional or bidirectional.

According to another aspect of the present invention, a graphics processor includes a test pixel source, an input port, a pixel selection logic circuit coupled to the input port and the test pixel source, a pattern detection circuit coupled to the pixel selection logic circuit, and an output port coupled to the pixel selection logic circuit. The test pixel source is configured to supply a sequence of test pixels during a test operation, and the input port configured to receive a sequence of external pixels from another graphics processor (if one is connected). The pixel selection logic circuit is configured to select the sequence of external pixels or the sequence of test pixels as a sequence of output pixels during the test operation. The pattern detection circuit is configured to detect whether, during the test operation, the sequence of selected output pixels corresponds to the sequence of test pixels. The output port is configured to deliver the sequence of selected output pixels to another graphics processor (if one is connected). The test operation is usable to determine whether the input port or the output port is connected to another graphics processor. In one embodiment, during a first test operation to determine whether the input port is connected to another graphics processor, the pixel selection logic circuit selects the sequence of external pixels, and during a second test operation to determine whether the output port is connected to another graphics processor, the pixel selection logic circuit selects the sequence of test pixels.

According to still another aspect of the present invention, a graphics subsystem includes two or more graphics processors. Each of the graphics processors includes a test pixel source, an input port, a pixel selection logic circuit coupled to the input port and the test pixel source, a pattern detection circuit coupled to the pixel selection logic circuit, and an output port coupled to the pixel selection logic circuit. The test pixel source is configured to supply a sequence of test pixels during a test operation, and the input port configured to receive a sequence of external pixels from another one of the graphics processors (if one is connected). The pixel selection logic circuit is configured to select the sequence of external pixels or the sequence of test pixels as a sequence of output pixels during the test operation. The pattern detection circuit is configured to detect whether, during the test operation, the sequence of selected output pixels corresponds to the sequence of test pixels. The output port is configured to deliver the sequence of selected output pixels to another one of the graphics processors (if one is connected). The graphics subsystem also includes control logic configured to control the pixel selection logic circuits in each of the graphics processors. The control logic is configured such that during the test operation, the pixel selection logic circuit of a first one of the graphics processors selects the sequence of test pixels and the pixel selection logic circuit of a second one of the graphics processors selects the sequence of external pixels. A connection between the first graphics processor and the second graphics processor is detected in the event that during the test operation, the pattern detection circuit of the second graphics processor detects that the sequence of selected output pixels corresponds to the sequence of test pixels.

The following detailed description together with the accompanying drawings will provide a better understanding of the nature and advantages of the present invention.

DETAILED DESCRIPTION OF THE INVENTION

Embodiments of the present invention provide graphics processing systems that automatically detect the connection topology among two or more graphics processors that might or might not be interconnected. A display head of a first graphics processor can be operated as a pixel source to generate a test pattern on an output port, with other graphics processors passing through pixel data received from an input port. If one of the other graphics processors is connected to the output port of the first graphics processor, the other graphics processor will also output the test pattern. By detecting which (if any) of the other graphics processors output the test pattern, the connectivity of the first graphics processor can be determined. In some embodiments, information about the connection topology can be used to configure links between the graphics processor; for instance, the graphics processing system can automatically identify one or more "master" graphics processors to which one or more monitors are connected, then configures the links of the ring such that one or more other graphics processors can deliver pixels to the master graphics processor.

System Overview

Figure 1:
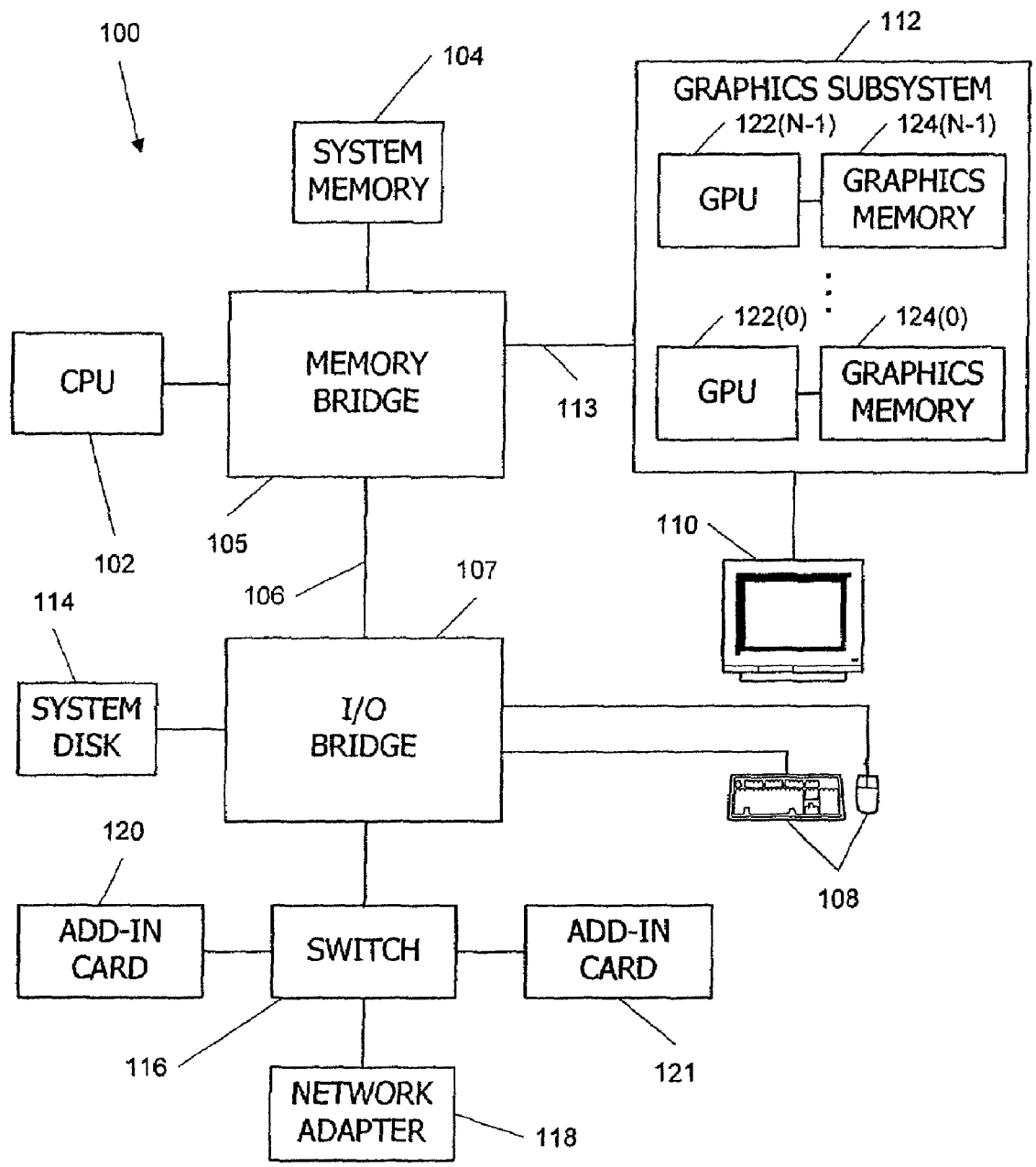
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105 is connected via a bus path 106 to an I/O (input/output) bridge 107. I/O bridge 107 receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to memory bridge 105 via a bus 113. A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI Express (PCI-E), AGP (Advanced Graphics Processing), Hypertransport, or any other bus protocol(s), and connections between different devices may use different protocols as is known in the art.

Graphics subsystem 112 includes a number N of graphics processing units (GPUs) 122, where N is at least 2. (Herein, multiple instances of like objects are denoted with reference numbers identifying the object and parenthetical numbers identifying the instance where needed.) Each GPU 122 has an associated graphics memory 124. GPUs 122 and graphics memories 124 may be implemented, e.g., using one or more integrated circuit devices such as programmable processors, application specific integrated circuits (ASICs), and memory devices. In some embodiments, GPUs 122 and graphics memories 124 are implemented in one or more expansion cards or other adapters that can be inserted into and removed from expansion slots (e.g., PCI-E slots) in system 100. Any number N (2 or more) of GPUs 122 may be used.

Each GPU 122 may be configured to perform various tasks related to generating pixel data (also referred to herein as "pixels") from graphics data supplied by CPU 102 and/or system memory 104 via memory bridge 105 and bus 113, interacting with a respective graphics memory 124 to store and update pixel data, and the like. For example, a GPU 122 may generate pixel data from 2-D or 3-D scene data provided by various programs executing on CPU 102. A GPU 122 may also store pixel data received via memory bridge 105 to graphics memory 124 with or without further processing. Each GPU 122 also includes a scanout module (also referred to herein as a display pipeline) that can be configured to deliver pixel data from graphics memory 124 an output port of the GPU 122 as described below. The output port might or might not be connected to a monitor or to another GPU 122.

For operations in a distributed rendering mode, an output port of one GPU (e.g., GPU 122(0)) may be configured to deliver scanned-out pixels to another GPU (e.g., GPU 122(N−1)), which selects between internal pixels from its own display pipeline and external pixels received from GPU 122(0). More than two GPUs 122 can be interconnected in a "daisy-chain" fashion, such that a slave GPU 122 delivers its pixels to an intermediate GPU 122, which selects between its internal pixel and the external pixel from the slave, then forwards the selected pixel to another GPU, and so on until the ultimate master GPU (i.e., the GPU connected to a monitor) delivers the final selected pixels to a display device.

In accordance with an embodiment of the present invention, GPUs 122 can be interconnected with each other in such a way that any GPU 122 can be slaved to any other GPU 122 by adjusting configuration settings of the GPUs 122 without any alteration of the physical connections. A suitable interconnection topology is described below.

Various distributed rendering modes can be supported. For instance, in split-frame rendering, different GPUs 122 are assigned to render different portions of the same image; in alternate frame rendering, different GPUs 122 are assigned to render different images in a sequence of images to be displayed. A particular distributed rendering mode is not critical to the present invention.

In some embodiments, some or all of GPUs 122 may be also operable in an "independent rendering" mode in which different ones of GPUs 122 render images for different display devices; the images rendered by different GPUs 122 in independent rendering mode might or might not be related to each other. It is to be understood that GPUs 122 may be configurable to operate in any of the above or other modes.

CPU 102 operates as the master processor of system 100, controlling and coordinating operations of other system components. In particular, CPU 102 issues commands that control the operation of GPUs 122. The commands may include conventional rendering commands for generating images as well as general-purpose computation commands that enable applications executing on CPU 102 to leverage the computational power of GPUs 122 for data processing that may be unrelated to image generation.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of GPUs 122 to the rest of system 100 may also be varied. In some embodiments, graphics subsystem 112 is implemented using one or more expansion cards that can be inserted into expansion slots of system 100, with one or more GPUs 122 on each card. In other embodiments, one or more of GPUs 122 is integrated on a single chip with a bus bridge, such as memory bridge 105 or I/O bridge 107.

Each GPU may be provided with any amount of local graphics memory, including no local memory, and may use local memory and system memory in any combination. For instance, in a unified memory architecture (UMA) embodiment, little or no dedicated graphics memory is provided, and some or all of the GPUs may system memory exclusively or almost exclusively. In UMA embodiments, a GPU may be integrated into a bus bridge chip or provided as a discrete chip with a high-speed bus (e.g., PCI-E) connecting the GPU to the bridge chip and system memory.

In addition, graphics subsystems embodying aspects of the present invention may be incorporated into a variety of devices, including general purpose computer systems, video game consoles and other special purpose computer systems, DVD players, handheld devices such as mobile phones or personal digital assistants, and so on.

Interconnection of GPUs

The present invention relates to configurations in which multiple GPUs 122 are interconnected to support distributed rendering in various master/slave configurations. To facilitate understanding the present invention, an interconnection scheme for GPUs that is usable to practice the present invention will be described.

Figure 2A:
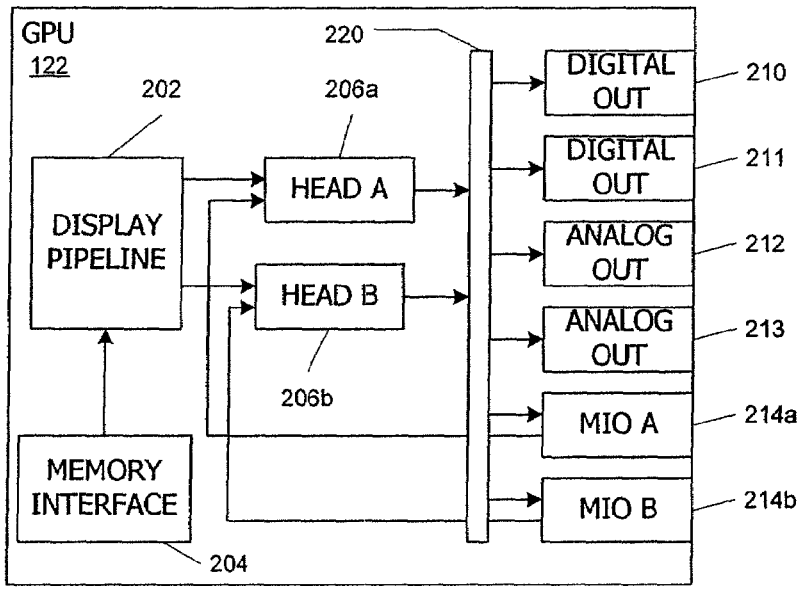
FIG. 2A is a block diagram of a pixel output path in a graphics processor usable to practice the present invention.

FIG. 2A is a block diagram of a pixel output path in a GPU 122 usable to practice the present invention. It is to be understood that a similar path is advantageously present in each GPU 122. As shown in FIG. 2A, GPU 122 includes a display (or scanout) pipeline 202 coupled to a memory interface 204. Display pipeline 202 is also coupled to display heads 206a ("head A") and 206b ("head B"). GPU 122 has multiple output ports 210-213, including digital output ports 210, 211, and analog output ports 212, 213. GPU 122 also has two multipurpose input/output (MIO) ports 214a ("MIO A") and 214b ("MIO B") that are configurable for various purposes, including communication with another GPU or with another external digital device. Display heads 206a and 206b are each coupled to output ports 210-213 and MIO ports 214a, 214b via a crossbar 220.

Memory interface 204 is coupled to a memory (not shown in FIG. 2A), e.g., graphics memory 124 of FIG. 1, that stores pixel data generated by GPU 122. Display pipeline 202 communicates with memory interface 204 to access the stored pixel data. Display pipeline 202 delivers the pixel data to either or both display head 206a, 206b. In some embodiments, display pipeline 202 may perform various processing operations on the pixel data before delivering it to display heads 206a, 206b, and pixel data destined for display head 206a might or might not be processed differently from pixel data destined for display head 206b. The particular configuration of display pipeline 202 and memory interface 204 is not critical to the present invention, and a detailed description is omitted.

Digital output ports 210, 211 may be of generally conventional design and may include circuits that modify the pixel data to conform to a digital output standard. For instance, in one embodiment, each of ports 210, 211 implements TMDS (Transition Minimized Differential Signaling) for a standard DVI (Digital Video Interface) connector. Similarly, analog output ports 212, 213 can be of generally conventional design and may include, e.g., a digital to analog converter conforming to any analog video standard, numerous examples of which are known in the art. It will be appreciated that the presence, absence, number, or nature of particular digital or analog output ports is not critical to the present invention.

MIO A port 214a and MIO B port 214b can be configured to drive pixel data produced by either of display heads 206a, 206b onto output lines. MIO A port 214a can also be configured to receive pixel data from display head A 206a, while MIO B port 214b can also be configured receive pixel data from display head B 206b. In this embodiment, MIO A port 214a and MIO B 214b are each independently configurable as either an input port or an output port. The configuration of MIO A port 214a and MIO B port 214b may be determined during system startup or dynamically modified. For instance, each MIO port may include a control register that stores a value specifying the port configuration, and a new value may be written to the register at system startup or at other times as desired.

Head A 206a and head B 206b are each coupled to output ports 210-213, as well as to MIO ports 214a, 214b via crossbar 220. In this embodiment, crossbar 220 is configurable to support any connection between head A 206a and any one of ports 210-213, 214a, or 214b and to simultaneously support any connection between head B 206b and any one of ports 210-213, 214a, or 214b that is not currently connected to head A 206a. For instance, GPU 122 can simultaneously drive pixel data from heads 206a, 206b to two different monitors (e.g., via any two of digital output ports 210, 211 and/or analog output ports 212, 213). Alternatively, GPU 122 can simultaneously drive pixels to a monitor via one of output ports 210-213 and to another GPU via MIO A port 214a or MIO B port 214b.

In some embodiments, crossbar 220 is configured at system startup; in other embodiments, crossbar 220 is dynamically configurable, so that the connections can be changed during system operation. Crossbar 220 may also be configurable to couple incoming pixel data received at one of MIO ports 214a, 214b to either of display heads 206a, 206b.

MIO ports 214a, 214b can also be configured to receive pixel data from another one of GPUs 122 and to communicate the received pixel data into display heads 206a, 206b. Each GPU 122 also has selection logic in each display head 206a, 206b to select between an "external" pixel received from one of MIO ports 214a, 214b and an "internal" pixel received from its own display pipeline 202.

Figure 2B:
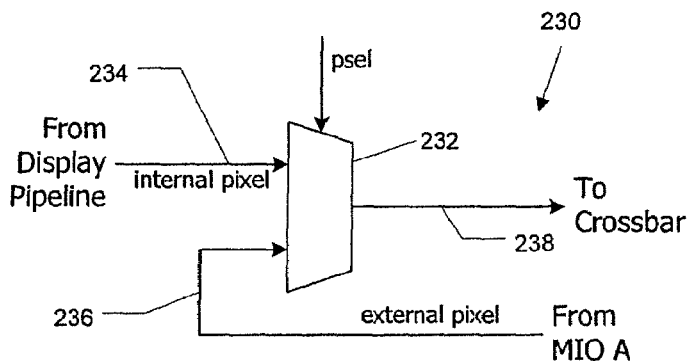
FIG. 2B is a block diagram of pixel selection logic in a display head of a graphics processor usable to practice the present invention.

For instance, FIG. 2B is a block diagram of pixel selection logic 230 in display head A 206a according to an embodiment of the present invention. A multiplexer 232 receives an internal pixel on a signal path 234 from display pipeline 202. If MIO A port 214a is configured as an input port, multiplexer 232 also receives an external pixel on a signal path 236 from MIO A port 214a. A pixel selection (psel) signal selects either the internal pixel on path 234 or the external pixel on path 236 for delivery to an output path 238 that connects to crossbar 220. It is to be understood that similar logic can be implemented in head B 206b using external pixels from MIO B port 214b. Further, in other embodiments, each display head 206a, 206b might be configurable to receive external pixels from either MIO port 214a, 214b.

Figure 2C:
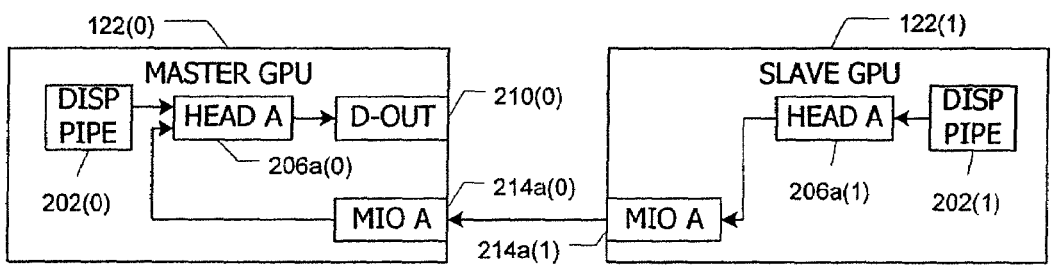
FIG. 2C is a block diagram showing two graphics processors in a master/slave readout configuration.

MIO ports 214a, 214b and selection logic 230 can be used to support master/slave operation of multiple GPUs 122 for distributed rendering. FIG. 2C is a simplified block diagram showing two GPUs 122 in a master/slave readout configuration; for clarity, only the active ports and display heads are shown. A slave GPU 122(1) has its MIO A port 214a(1) configured as an output port, while a master GPU 122(0) has its MIO A port 214a(0) configured as an input port. MIO A port 214a(1) is coupled to MIO A port 214a(0) via a connection path 242, allowing pixel data to flow from slave GPU 122(1) to master GPU 122(0).

Head A 206a(1) of slave GPU 122(1) forwards pixel data provided by display pipeline 202(1) of slave GPU 122(1) to MIO A port 214a(1). The pixel data travels via path 242 to MIO A port 214a(0) of master GPU 122(0), which forwards the data to head A 206a(0). In head A 206a(0), selection logic 230 (see FIG. 2B) operates to select between internal pixels from display pipeline 202(0) of master GPU 122(0) and external pixels originating in display pipeline 202(1) of slave GPU 122(1). The particular selection will depend on the specifics of a distributed rendering implementation (e.g., whether different GPUs 122 are rendering different portions of the same frame or different successive frames) and is not relevant to the present invention.

Head A 206a(0) of master GPU 122(0) delivers pixel data to an output port, in this case digital output port 210(0). It will be appreciated that head A 206a(0) of master GPU 122(0) could be configured to deliver pixel data to MIO B port 214b(0) (not explicitly shown in FIG. 2C), which could be connected to an MIO port of a third GPU, which would then be a master to GPU 122(0). Thus, any number of GPUs 122 may be connected for distributed rendering.

Bidirectional Ring Connection Topology

In accordance with an embodiment of the present invention, MIO A ports 214a and MIO B ports 214b of different GPUs 122 are interconnected in a bidirectional ring topology, allowing any GPU 122 to be configured as a master or slave to any other GPU 122 by configuring MIO ports 214a, 214b appropriately, without modifying any physical connections between the GPUs.

Figure 3:
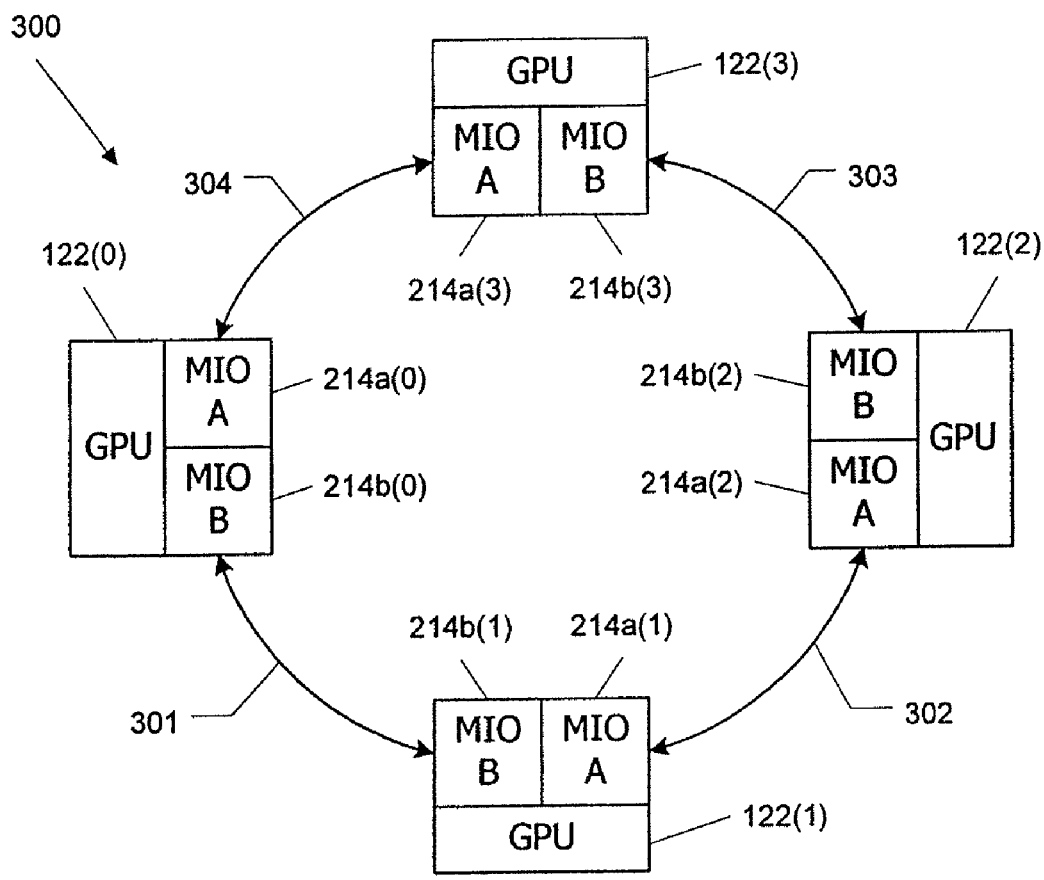
FIG. 3 illustrates a graphics subsystem with four graphics processors connected in a bidirectional ring topology according to an embodiment of the present invention.

FIG. 3 illustrates a graphics subsystem 300 with four GPUs 122 connected in a bidirectional ring topology according to an embodiment of the present invention. GPU 122(0) has its MIO A port 214a(0) connected to the MIO A port 214a(1) of GPU 122(1) via a link 301 and its MIO B port 214b(0) connected to the MIO B port 214b(3) of GPU 122(3) via a link 304. Similarly, GPU 122(2) has its MIO A port 214a(2) connected to the MIO A port 214a(3) of GPU 122(3) via a link 303 and its MIO B port 214b(2) connected to the MIO B port 214b(1) of GPU 122(1) via a link 302. Links 301-304 can be implemented in any manner desired as long as each link 301-304 is capable of delivering data in either direction.

In operation, master-slave relationships between adjacent GPUs are established by configuring the MIO ports and thereby configuring links 301-304. For example, GPU 122(1) can be slaved to GPU 122(0) by configuring MIO A port 214a(1) as an output port and MIO A port 214a(0) as an input port. In this configuration, link 301 delivers data from GPU 122(1) to GPU 122(0). The MIO ports can be reconfigured such that MIO A port 214a(0) operates as an output port and MIO A port 214a(1) operates as an input port; GPU 122(0) is then slaved to GPU 122(1).

It should be noted that it is also possible for a link to be idle. For instance, if MIO A port 214a(1) is configured as an output port but neither display head of GPU 122(1) is delivering pixels to MIO A port 214a(1), link 301 will be idle.

It is to be understood that FIG. 3 illustrates the connection topology, not necessarily the physical arrangement of GPUs. Similarly, use herein of terms such as "neighbors," "neighboring," or "adjacent" to describe GPUs should be understood as referring to the connection topology and not to a particular physical arrangement.

Figure 4:
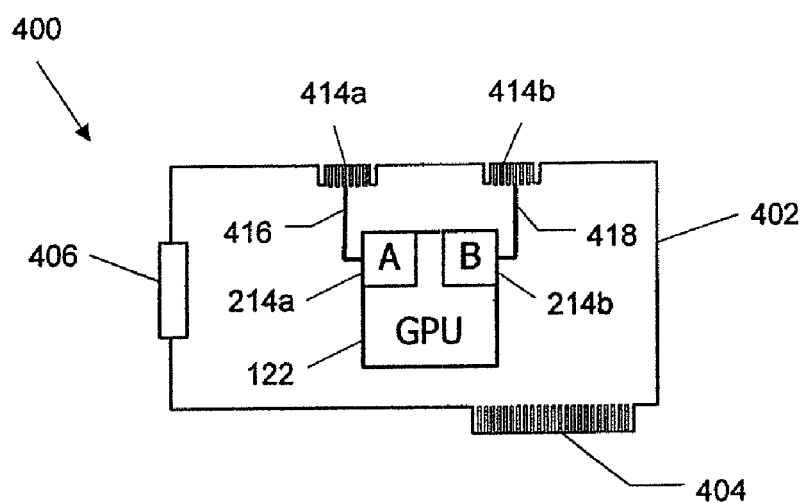
FIG. 4 illustrates a graphics adapter that can be used to implement the graphics subsystem of FIG. 3 according to an embodiment of the present invention.

FIG. 4 illustrates a graphics adapter 400 that can be used to implement graphics subsystem 300 according to an embodiment of the present invention. Graphics adapter 400 is implemented as an expansion card using a printed circuit board (PCB) 402 that conforms to PCI-E or another interconnection standard. GPU 122 is mounted on PCB 402 and coupled to a system connector 404 via wire traces (not shown) on PCB 402. System connector 404 is designed to be inserted into a PCI-E expansion slot (or any other type of expansion slot), enabling communication between GPU 122 and the rest of a computer system. GPU 122 is also coupled to a display output connector 406 via wire traces (not shown) on PCB 402. Display output connector 406 is advantageously connected to one of digital output ports 210, 211 or analog output ports 212, 213 of GPU 122 (see FIG. 2A). In some embodiments, PCB 402 may provide multiple display output connectors 406, each connected to a different one of output ports 210-213, as is known in the art.

PCB 402 also includes two graphics edge connectors 414a, 414b, which can be of identical design. Graphics edge connector 414a connects to MIO A port 214a of GPU 122 via wire traces 416 while graphics edge connector 414b connects to MIO B port 214b of GPU 122 via wire traces 418. Each graphics edge connector 414a, 414b is configured for electrical and mechanical connection to an interconnect device (not shown). The interconnect device can be, e.g., a ribbon cable or a PCB with wire traces printed along its length, with receptacles at either end for receiving a graphics edge connector 414a, 414b, allowing two adapters 400 to be connected to each other. It should be noted that where graphics connectors 414a and 414b are identical, connector 414a of a first graphics adapter 400 can be connected to connector 414a or connector 414b of a second graphics adapter 400. Thus, an MIO A port 214a of one GPU 122 can be connected to either an MIO A port 214a or an MIO B port 214b of another GPU 122.

Those skilled in the art with access to the present teachings will recognize that four instances of adapter 400 can be used to implement graphics subsystem 300 by interconnecting graphics adapters 414a, 414b of all four adapters 400 to form a ring connecting all four adapters 400.

Figure 5A:
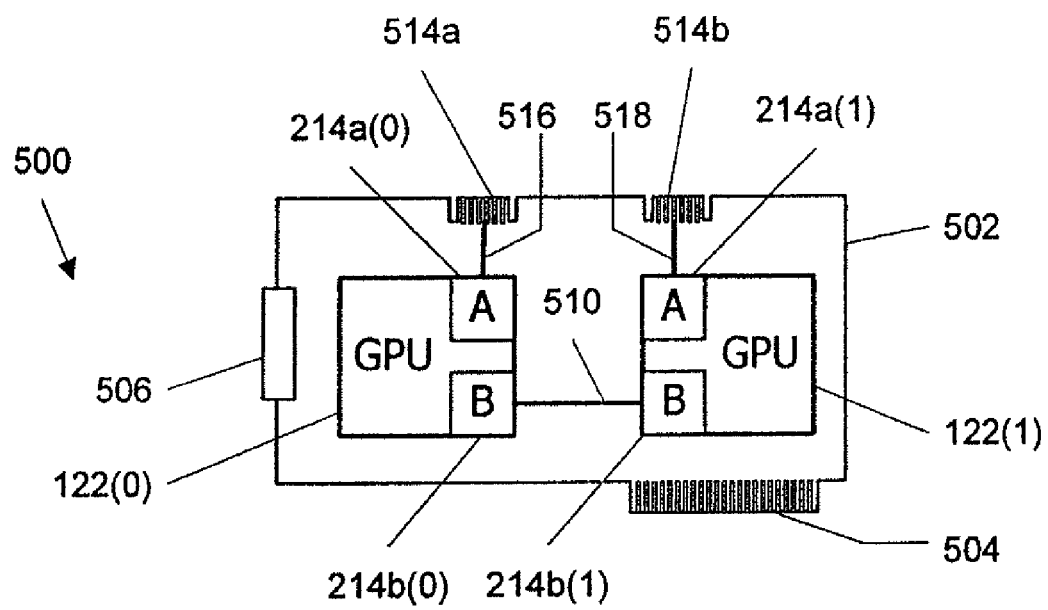
FIG. 5A illustrates a graphics adapter that can be used to implement the graphics subsystem of FIG. 3 according to another embodiment of the present invention.

In an alternative embodiment, more than one GPU 122 can be mounted on a single PCB. FIG. 5A illustrates a graphics adapter 500 that can be used to implement graphics subsystem 300 according to another embodiment of the present invention. In this embodiment, graphics adapter 500 is implemented as an expansion card using a printed circuit board (PCB) 502 that conforms to PCI-E or another interconnection standard. Two GPUs 122(0) and 122(1) are mounted on PCB 502 and coupled to a system connector 504 via wire traces (not shown) on PCB 502. In some embodiments, this connection path may include additional circuitry allowing GPUs 122 to share access to system connector 504. Each GPU 122 is also coupled to one or more display output connectors 506 via wire traces (not shown) on PCB 500; separate display output connectors 506 can be provided for each GPU 122.

In this embodiment, MIO B port 214b(0) of GPU 122(0) and MIO B port 214b(1) of GPU 122(1) are permanently connected to each other via wire traces 510 on PCB 502. MIO A port 214a(0) of GPU 122(0) is connected to a graphics edge connector 514a via wire traces 516, while MIO A port 214a(1) of GPU 122(1) is connected to a graphics edge connector 514b via wire traces 518. Graphics edge connectors 514a and 514b can be identical to graphics edge connectors 414a and 414b (FIG. 4).

Figure 5B:
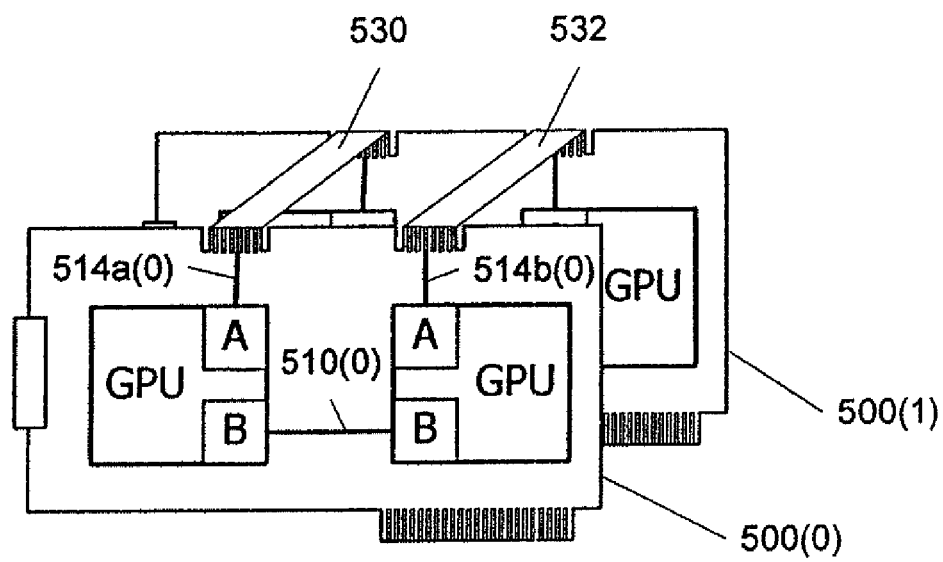
FIG. 5B illustrates interconnection of two of the graphics adapters of FIG. 5A to implement the graphics subsystem of FIG. 3 according to an embodiment of the present invention.

FIG. 5B illustrates interconnection of two graphics adapters 500 to implement graphics subsystem 300 of FIG. 3 according to an embodiment of the present invention. A first interconnect device 530 couples graphics edge connector 514a(0) of adapter 500(0) to graphics edge connector 515(1) of adapter 500(1), and a second interconnect device 532 couples graphics edge connector 515(0) of adapter 500(0) to graphics edge connector 514(1) of adapter 500(1). Referring to FIG. 3, interconnect devices 530 and 532 may implement, e.g., links 304 and 302, respectively, while the wire traces 510 on adapters 500(0) and 500(1) implement links 301 and 303, respectively.

It will be appreciated that the graphics adapters and interconnect devices described herein are illustrative and that variations and modifications are possible. The shape and layout of the adapters and interconnect devices may be modified from those shown herein, and any communication protocol may be implemented for transferring data between MIO ports. It is also possible to interconnect one or more adapters 400 and one or more adapters 500 in a single system, provided that both types of adapters use the same protocol.

Detecting Connection Topology

As noted above, in some embodiments, either MIO port of one GPU can be connected to either MIO port of another GPU. Further, even in embodiments where some MIO ports are permanently connected (e.g., as in FIG. 5B), some connections might be determined when interconnect devices (e.g., 530, 532) are put into place by a system assembler or end user. In addition, a system assembler or end user might choose not to interconnect all GPUs. Some embodiments of the present invention provide the ability to automatically determine a connection topology of a multi-GPU system, e.g., during system startup.

Figure 6:
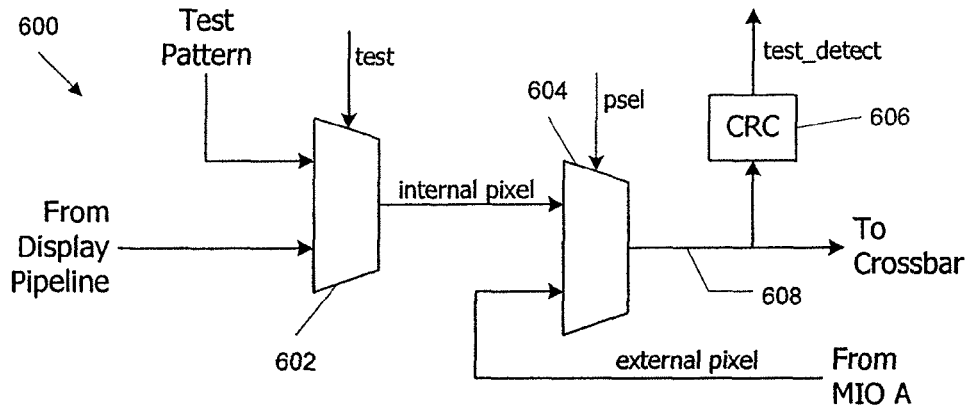
FIG. 6 is a simplified block diagram of a topology detection logic circuit according to an embodiment of the present invention.

FIG. 6 is a simplified block diagram of a topology detection logic circuit 600 that can be implemented in display head A 206a of a GPU 122 (see FIG. 2A) according to an embodiment of the present invention. Similar logic can also be implemented in display head B 206b. Topology detection logic circuit 600 incorporates pixel selection logic 230 of FIG. 2B in combination with additional components that can be used for topology detection and other system test operations. In some embodiments, each display head 206a, 206b of each GPU 122 includes a circuit corresponding to circuit 600.

Circuit 600 includes a test multiplexer 602, an internal/external multiplexer 604 and a programmable cyclic redundancy check (CRC) or pattern detection unit 606. Test multiplexer 602 selects between pixels generated by display pipeline 202 (see FIG. 2A) and pixels of a predetermined test pattern supplied on a signal path 610. In one embodiment, the test pattern is a single color value stored in a register (not explicitly shown) in GPU 122 and delivered on every cycle to test multiplexer 602.

Test multiplexer 602 is controlled by a test-mode control signal that is asserted when head A 206a of GPU 122 is operated in a test mode and deasserted otherwise. When the test mode signal is asserted, test multiplexer 602 always selects test pattern pixels, and when the test mode signal is deasserted, test multiplexer 602 always selects display pipeline pixels. Internal/external multiplexer 604, which corresponds to multiplexer 232 of FIG. 2B, selects between the internal pixel and an external pixel received from MIO A port 214a and delivers the selected pixel on an output path 608.

CRC unit 606 detects the pixels on output path 608 and computes a checksum over a suitable number of pixels (in one embodiment, an entire frame of pixel data is used). Conventional checksum algorithms may be used. CRC unit 606 can be configured to compare the computed checksum to a checksum corresponding to the test pattern in order to determine whether the output is the test pattern. A test_detect signal is asserted if the output is the test pattern and deasserted otherwise. In some embodiments, CRC unit 606 can also be configured to perform other checksum tests in order to verify correct device operation as is known in the art, with the test_detect signal being used convey information indicating the outcome of the currently configured checksum test.

Figure 7:
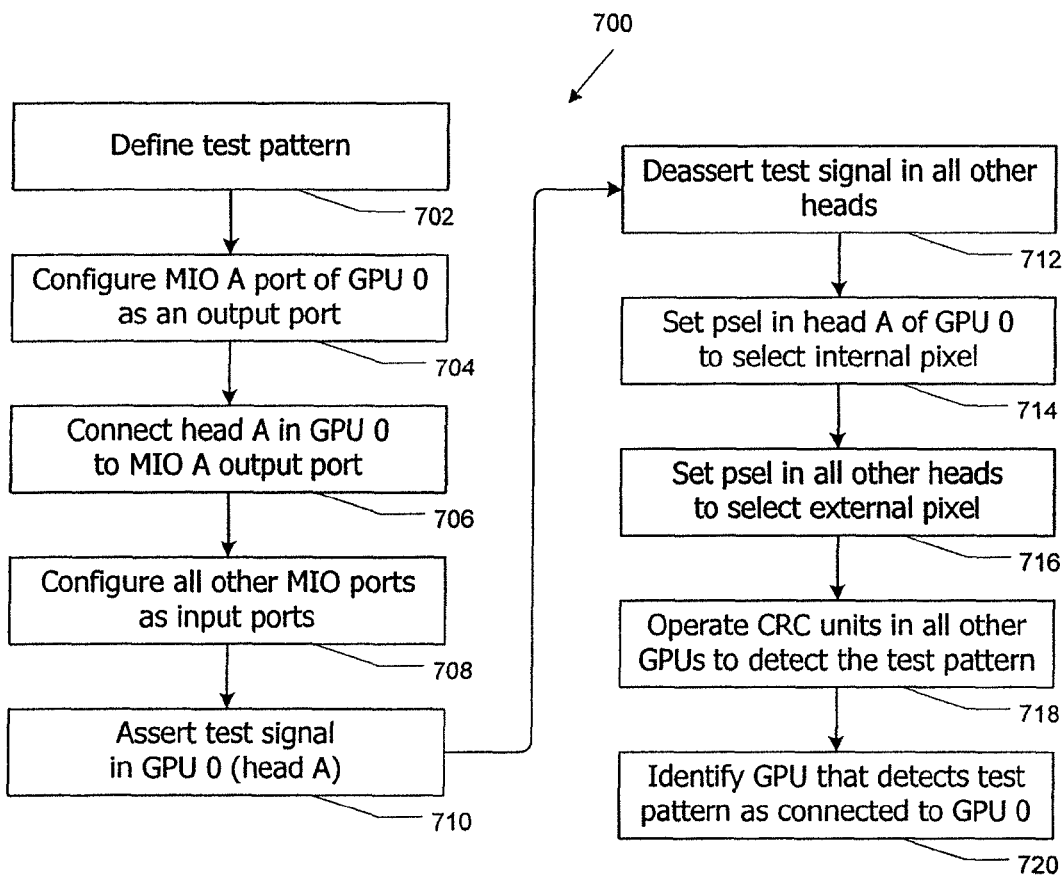
FIG. 7 is a flow diagram of a process for using the circuit of FIG. 6 to determine information about connection topology in a multi-processor graphics subsystem according to an embodiment of the present invention.

FIG. 7 is a flow diagram of a process 700 for using circuit 600 to determine information about connection topology in a multi-GPU system according to an embodiment of the present invention. Process 700 can be performed, e.g., at system startup, by a graphics driver program executing on CPU 102 (see FIG. 1) that manages the graphics subsystem or by another suitable agent. During system startup, prior to execution of process 700, each GPUs 122 indicates its presence to the driver, and each GPU 122 is assigned a unique device ID (0, 1, 2, etc. are used herein). Each GPU 122 may also report other information such as whether it has any MIO ports that can be used to connect to another GPU 122.

Thus, the graphics driver initially receives information indicating the number of GPUs 122 and whether they can be interconnected (but not whether they are interconnected). Using process 700, the driver tests MIO A port 214a(0) of GPU 122(0) to determine which, if any, GPU 122 is connected to that port. As described below, process 700 can be repeated to investigate other MIO ports until the entire connection topology is determined.

At step 702 a test pattern is defined. As noted above, the test pattern may be a single color that is repeated for every pixel or any other pattern. At step 704, MIO A port 214a(0) of GPU 122(0) is configured as an output port, and at step 706, crossbar 220(0) of GPU 122(0) (see FIG. 2A) is configured to connect pixel data from head A 206a(0) to MIO A port 214a(0). At step 708, both MIO ports 214a, 214b of all GPUs 122 other than GPU 122(0), as well as MIO B port 214b(0) of GPU 122(0), are configured as input ports.

At step 710, the test mode signal for display head A 206a(0) of GPU 122(0) is asserted, and at step 712, the test mode signal for all other display heads is deasserted. "All other display heads" in this context includes head B 206*b*(0) of GPU 122(0) as well as heads A 206*a* and B 206*b* of every GPU 122 other than GPU 122(0).

At step 714, the psel signal (see FIG. 6) in head A 206*a*(0) of GPU 122(0) is set to select the internal pixel on each cycle. Thus, the test pattern is propagated to output line 608 and from there to MIO A port 214*a*(0). Any GPU 122 that has an MIO port 214*a* (or 214*b*) connected to MIO A port 214*a*(0) will receive the test pattern at that MIO port 214*a* (or 214*b*).

To determine which (if any) other GPU 122 is receiving signals from GPU 122(0), at step 716, the psel signal (see FIG. 6) in all display heads other than head A 206*a*(0) of GPU 122(0) is set to select the external pixel while MIO A port 214*a*(0) is delivering the test pattern. At step 718, the CRC units 606 in all display heads other than head A 206*a*(0) are operated to determine whether line 608 of that head is carrying the test pattern. In this configuration, the test pattern appears on a line 608 of a display head 206*a* (or 206*b*) if and only if that display head 206*a* (or 206*b*) is connected to MIO A port 214*a*(0) of GPU 122(0). Accordingly, at step 720 if a CRC unit 606, e.g., the CRC unit 606 in head A 206*a*(1) of GPU 122(1), detects the test pattern, it can be concluded that MIO A port 214*a*(0) of GPU 122(0) is connected to MIO A port 214*a*(1) of GPU 122(1).

Once the connection to MIO A port 214*a*(0) (if any) has been identified, process 700 can be repeated with appropriate changes to determine which (if any) GPU 122 is connected to MIO B port 214*b*(0) of GPU 122(0). Similarly, process 700 can be repeated with appropriate changes to determine which (if any) GPU 122 is connected to an MIO port 214*a* (or 214*b*) of a different GPU 122. It should be noted that in some embodiments, all links are bidirectional. Accordingly, if it is determined by testing MIO A port 214*a*(0) that this port is connected to MIO A port 214*a*(1), there is no need to repeat the test for MIO A port 214*a*(1). Further, in embodiments such as that shown in FIG. 5B, where every GPU has its MIO B port permanently connected to the MIO B port of the only other GPU on the same graphics adapter, there is no need to test any of the MIO B ports if it is known that all of the graphics adapters are configured in this way and which GPUs are on the same graphics adapter.

EXAMPLE CONFIGURATIONS

System 300 of FIG. 3 can be configured to support any combination of display devices (monitors) attached to any of GPUs 122. To support distributed rendering, the MIO ports 214*a*, 214*b* of GPUs 122 can be configured such that any GPUs 122 not directly connected to a monitor deliver pixels (directly or indirectly) to a GPU 122 that is connected to a monitor. Several examples of configurations of system 300 will now be described. It will be apparent that other configurations are possible, and that the degree to which distributed rendering can be used depends in part on the number of monitors and where they are connected.

Figure 8A:
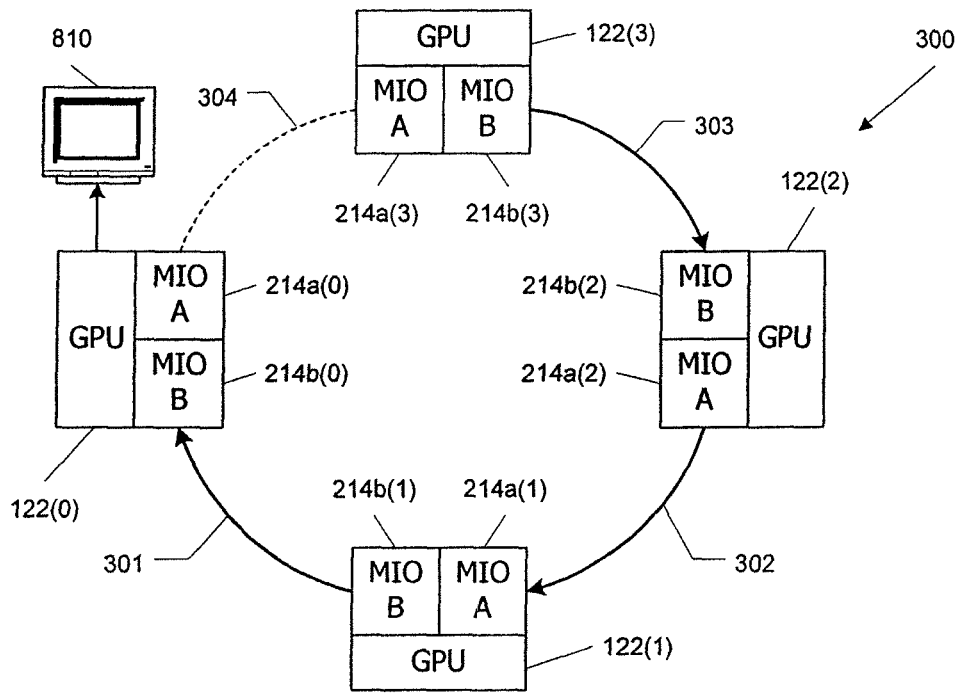
FIGS. 8A-8B illustrate single-monitor configurations of the graphics subsystem of FIG. 3 according to embodiments of the present invention.
Figure 8B:
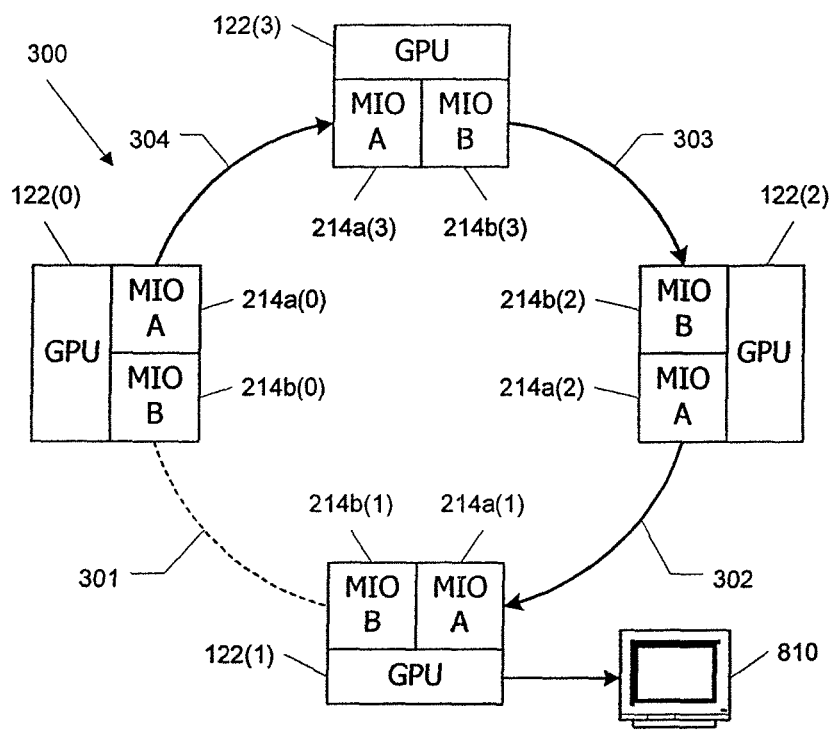

In some instances, a single monitor might be connected to one GPU 122 in system 300. In these instances, all GPUs 122 can be operated in distributed rendering mode to generate images for the single monitor, regardless of which GPU 122 is connected to the monitor. FIGS. 8A and 8B illustrate examples of single-monitor configurations for graphics subsystem 300 according to embodiments of the present invention.

In FIGS. 8A and 8B, as well as FIGS. 9-11 described below, it is to be understood that arrows are used to indicate the active direction of each link as configured, and that the configuration of a link can be established by configuring the MIO ports at either end as described above. Links that are idle are shown as dashed lines. Links can be made idle, e.g., by configuring the MIO ports at both ends as input ports or by configuring the crossbars in the two linked GPUs such that neither GPU drives pixels onto the link.

In FIG. 8A, a monitor 810 is connected to one of the output ports 210-213 (see FIG. 2A) of GPU 122(0) of subsystem 300. All four GPUs 122 are configured to operate in distributed rendering mode to deliver pixels to monitor 810.

Specifically, link 304 is configured to deliver pixels from GPU 122(3) to GPU 122(2); that is, MIO B port 214*b*(3) is configured as an output port while MIO B port 214*b*(2) is configured as an input port. A display head in GPU 122(2) selects between the external pixel from MIO B port 214*b*(2) and an internal pixel (see FIGS. 2B and 6) and delivers the selected pixels to MIO A port 214*a*(2), which is configured as an output port. Link 302 delivers the pixels from GPU 122(2) to MIO A port 214*a*(1) of GPU 122(1), which is configured as an input port. In GPU 122(1), a display head selects between the external pixel from MIO A port 214*a*(1) and an internal pixel and delivers the selected pixels to MIO B port 214*b*(1), which is configured as an output port. Link 301 delivers the pixels from GPU 122(1) to MIO B port 214*b*(0), which is configured as an input port. A display head in GPU 122(0) selects between the external pixel from MIO B port 214*b*(0) and an internal pixel and delivers the resulting pixels to monitor 810 via the appropriate output port. Link 304 is idle. It should be apparent that in this configuration, the ultimate source of a given display pixel could be any one of GPUs 122.

If the user connects monitor 810 to a different GPU, e.g., GPU 122(1), the link configuration shown in FIG. 8A would not support four-way distributed rendering. However, links 301-304 can be reconfigured to support four-way distributed rendering regardless of which GPU 122 is connected to the monitor. For instance, FIG. 8B shows a monitor 810 connected to GPU 122(1). Four-way distributed rendering is supported by configuring the MIO ports 214*a*, 214*b* such that link 304 delivers pixels from GPU 122(0) to GPU 122(3), link 303 from GPU 122(3) to GPU 122(2), and link 302 from GPU 122(2) to GPU 122(1). Link 301 is idle. It will be appreciated that numerous other configurations for supporting a single monitor are also possible.

It should be noted that for a conventional daisy chain topology, one of links 301-304 (e.g., link 304) would not exist, and reconfiguring the daisy chain to achieve both of the configurations shown in FIGS. 8A and 8B would not be possible without modifying the connection hardware.

In some embodiments, an appropriate configuration of the links is automatically selected and implemented. For example, during system startup, each GPU 122 can send signals to the graphics driver indicating which, if any, of its output ports are connected to a monitor. When only one monitor is connected to subsystem 300, the driver configures the links such that the GPU with the monitor connected, e.g., GPU 122(0) in FIG. 8A, is the ultimate master (i.e., it receives pixels from other GPUs 122 but does not send pixels to other GPUs 122). One of its neighbors (e.g., GPU 122(3) is selected as the ultimate slave (i.e., it sends pixels to other GPUs 122 but does not receive pixels from other GPUs 122), and the links are configured according to this selection.

Subsystem 300 can support more than one monitor. In some embodiments, each GPU can be connected to as many as two monitors, with the number being limited by the number of display heads (i.e. output paths that can be simultaneously active) in each GPU.

Figure 9A:
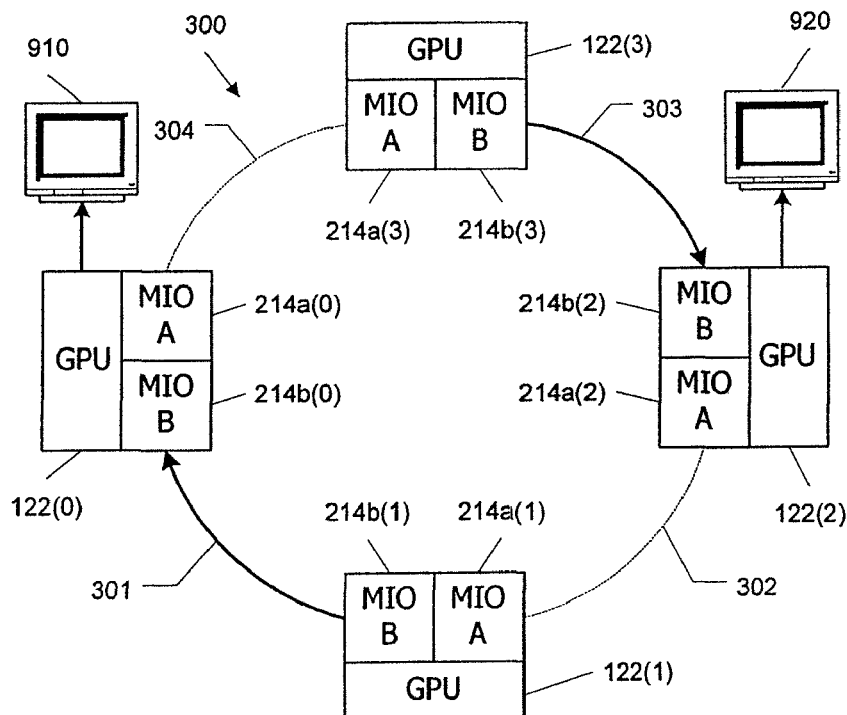
FIGS. 9A-9C illustrate two-monitor configurations of the graphics subsystem of FIG. 3 according to embodiments of the present invention.
Figure 9B:
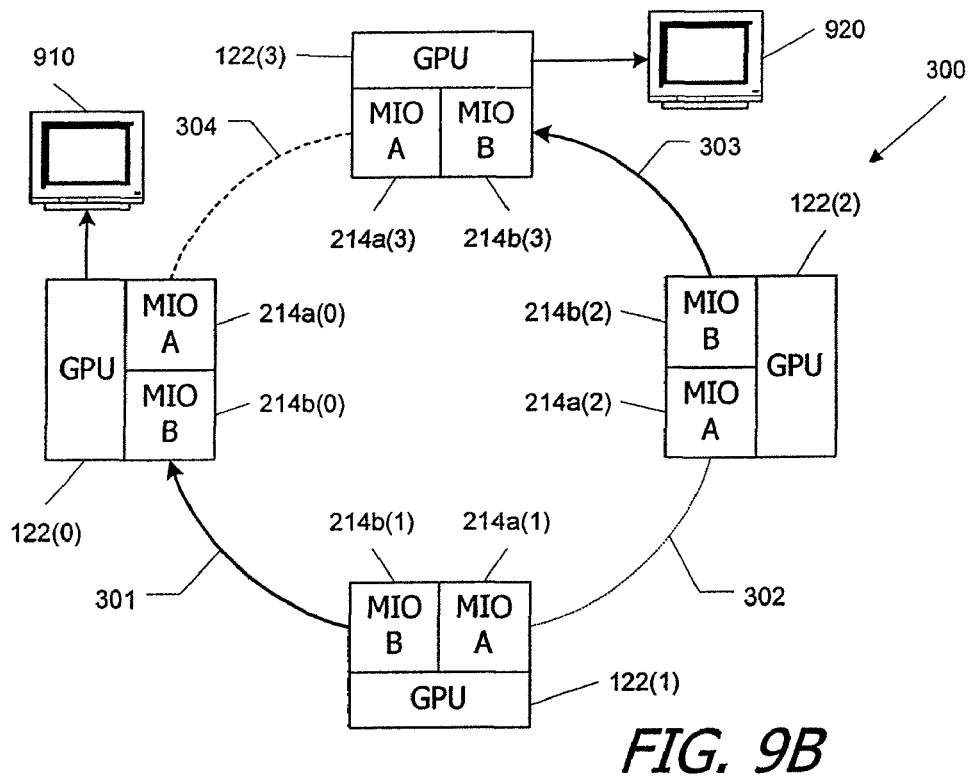
Figure 9C:
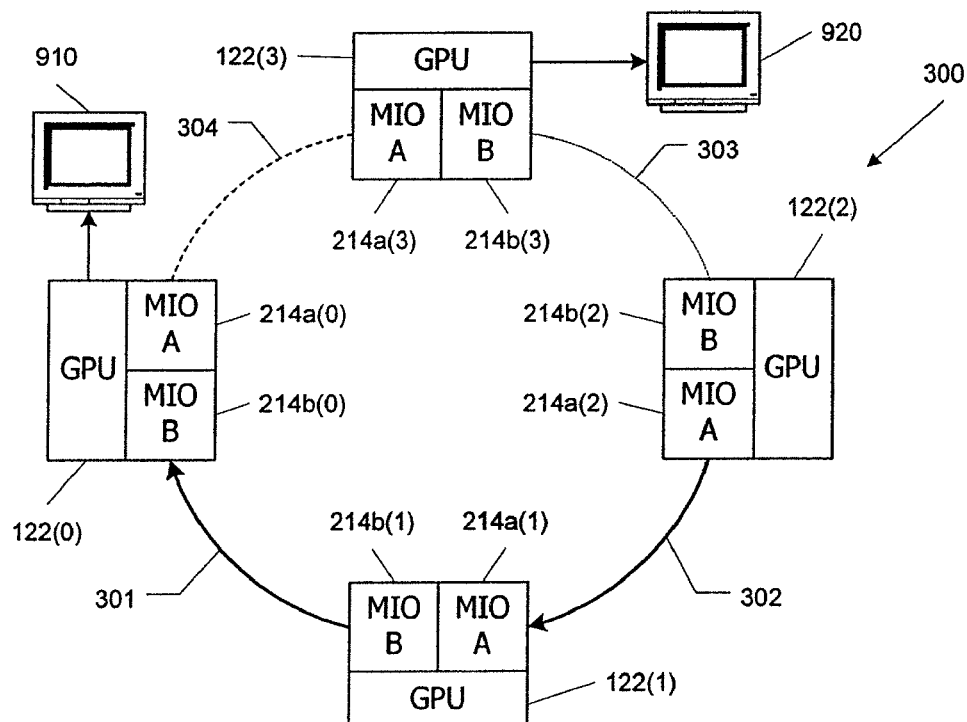

FIGS. 9A-9C illustrate two-monitor configurations of subsystem 300 according to embodiments of the present invention. In FIG. 9A a first monitor 910 is connected to GPU 122(0), and a second monitor 920 is connected to GPU 122(2). Two-way distributed rendering can be used for each monitor. Link 301 delivers pixels from slave GPU 122(1) to master GPU 122(0), while link 303 delivers pixels from slave GPU 122(3) to master GPU 122(2). Links 302 and 304 are idle.

In FIG. 9B, monitors 910 and 920 are connected to adjacent GPUs, in this case GPUs 122(0) and 122(3). Two-way distributed rendering can still be used for each monitor. Link 301 delivers pixels from slave GPU 122(1) to master GPU 122(0); link 303 operates in the reverse direction relative to FIG. 9A to deliver pixels from slave GPU 122(2) to master GPU 122(3). Links 302 and 304 are idle.

In some instances, it may be desirable to use three-way distributed rendering to support one monitor (e.g., monitor 910) with a single GPU supporting the other monitor 920. FIG. 9C illustrates one such configuration. Links 303 and 304 are idle. Link 302 is configured to deliver pixels from GPU 122(2) to GPU 122(1) and link 301 to deliver pixels from GPU 122(1) to GPU 122(0), which drives monitor 920. GPU 122(3) operates in single-chip mode to drive monitor 920. Such an asymmetric configuration may be advantageous in situations where the demand for graphics resources is unequal between the two monitors. For instance, monitor 910 might be used for graphics-intensive work (e.g., computer-aided design programs) while monitor 920 is used to run a word-processing program, e-mail program, and/or other programs that do not tax the resources of a single GPU 122.

As described in the single-monitor examples above, the location of each monitor in a multi-monitor configuration can be detected, and subsystem 300 can automatically be configured to support distributed rendering for each monitor, e.g., with an approximately equal number of GPUs supporting each monitor. In some embodiments, the user may be able to override the default behavior, e.g., by specifying via a driver interface how many GPUs should be used to support each monitor. The driver can configure the links of subsystem 300 in accordance with the user's preference.

Figure 10A:
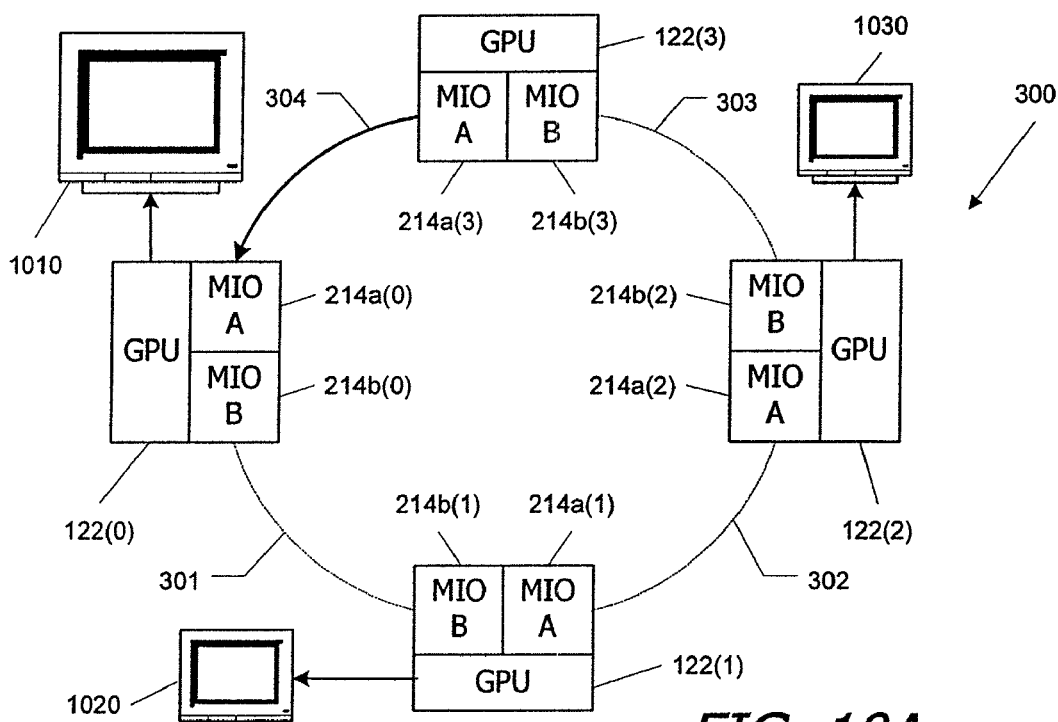
FIGS. 10A-10B illustrate three-monitor configurations of the graphics subsystem of FIG. 3 according to embodiments of the present invention.
Figure 10B:
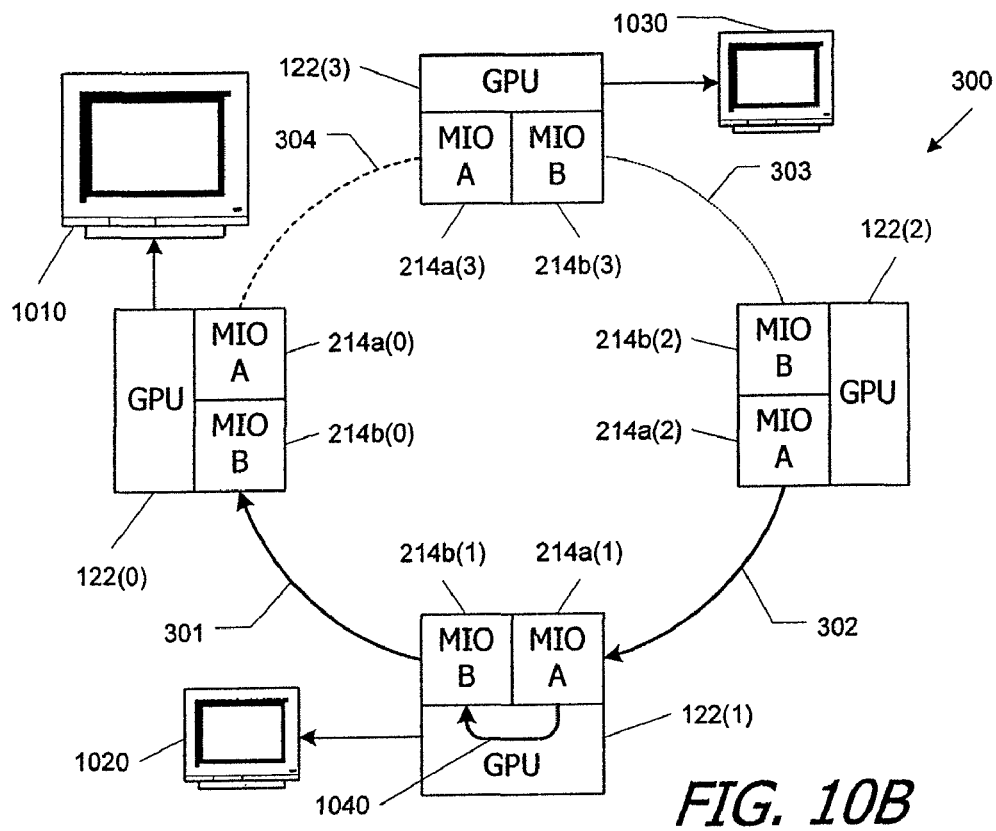

Example configurations of subsystem 300 with three monitors 1010, 1020, 1030 are shown in FIGS. 10A and 10B. In this example, a monitor 1010 is a primary monitor that is known to require a higher level of image detail than secondary monitors 1020, 1030. For example, existing flight simulators often use three monitors: one for the forward view and two others for left and right peripheral views. The forward view is the pilot's primary direction of focus and may require a higher level of detail to provide a realistic experience than either peripheral view. Thus, primary monitor 1010 might be used to display the forward view of a flight simulator while monitors 1020 and 1030 are used to display left and right peripheral views. It is to be understood that three-monitor configurations are not limited to flight simulator applications; any application or combination of applications may be supported.

In FIG. 1A, monitor 1010 is connected to GPU 122(0), monitor 1020 to GPU 122(1) and monitor 1030 to GPU 122(2). GPU 122(3), a neighbor of GPU 122(0) is not connected to a monitor; accordingly, GPU 122(3) can be slaved to master GPU 122(0) for two-way distributed rendering, with link 304 being used to deliver pixels from GPU 122(3) to GPU 122(0). Links 301-303 are idle, and GPUs 122(1) and 122(2) render images for monitors 1020 and 1030, respectively, in single-chip mode.

In FIG. 10B, monitor 1010 is connected to GPU 122(0), monitor 1020 to GPU 122(1) and monitor 1030 to GPU 122(3). Neither neighbor of GPU 122(0) is readily available for two-way distributed rendering since GPUs 122(1) and 122(3) are each advantageously used to render images for their respective monitors 1020 and 1030. GPU 122(2), however, can be used for two-way distributed rendering with GPU 122(0), even though it is not a neighbor, by using the second display head of GPU 122(1) as a pass-through.

More specifically, link 302 delivers pixels from GPU 122(2) to MIO A port 214a(1) of GPU 122(1), which is configured as an input port. Display head A 206a(1) in GPU 122(1) (see FIGS. 2A and 2B), which receives the pixels input to MIO A port 214a(1), is configured to select the external pixel in every case and deliver it to MIO B port 214b(1) of GPU 122, which is configured as an output port. Topologically, this creates a pass-through link 1040 via which all pixels received on link 302 are forwarded to link 301 for use by GPU 122(0). Operating in parallel with display head A 206a(1), display head B 206b(1) in GPU 122(1) selects internally generated pixels for delivery to monitor 1020. Thus, two GPUs that are not neighbors can be used together for distributed rendering by employing a third GPU as a pass-through link. It will be appreciated that similar pass-through links can also be used in other situations, and that any number of pass-through links may be serially arranged to convey pixel data from one GPU to another.

Figure 11:
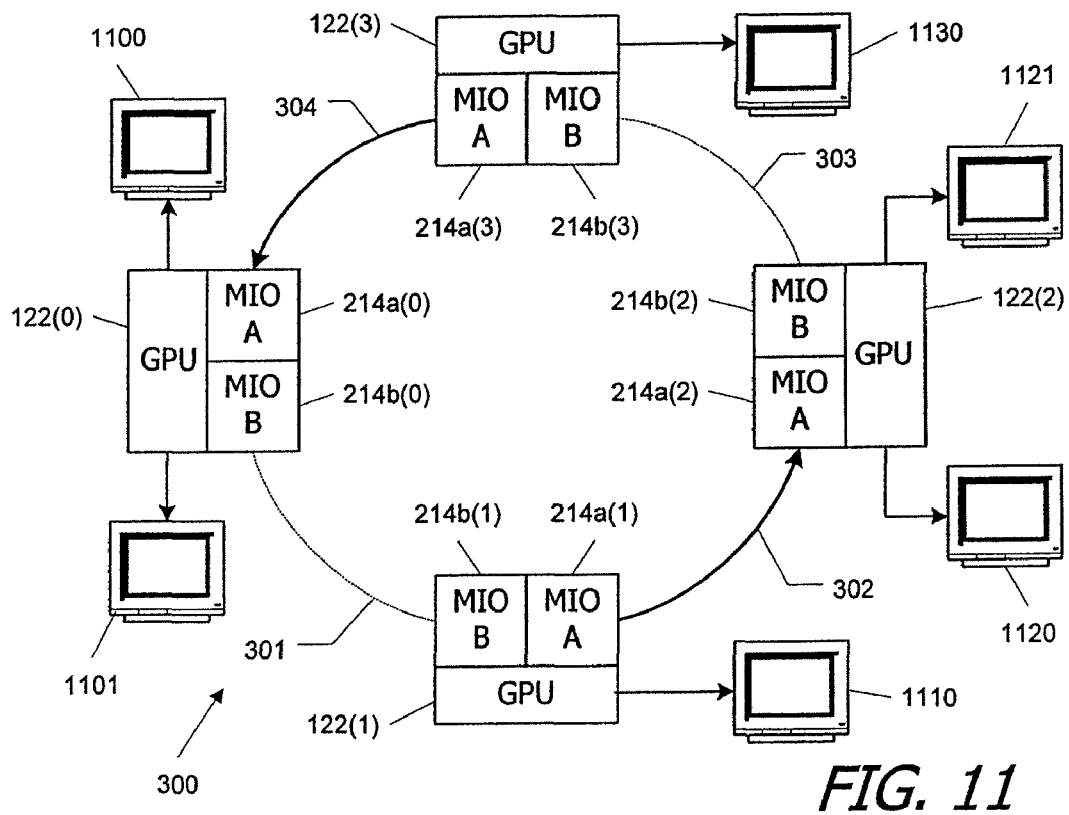
FIG. 11 illustrates a six-monitor configuration of the graphics subsystem of FIG. 3 according to an embodiment of the present invention.

FIG. 11 shows an example configuration with six monitors. GPU 122(0) drives two monitors 1100, 1101. GPU 122(1) drives one monitor 1110. GPU 122(2) drives two monitors 1120, 1121. GPU 122(3) drives one monitor 1130. In this embodiment, both display heads of GPU 122(0) and GPU 122(2) are used to drive monitors; therefore, GPUs 122(0) and 122(2) in this configuration are not used to deliver pixels to any other GPU. One option is to run all four GPUs in single-chip mode, in which case all of links 301-304 would be idle.

However, GPU 122(1) and GPU 122(3) each have a display head that is not in use, so these GPUs can deliver pixels to GPU 122(0) and GPU 122(2). Depending on the particular applications being executed on each GPU, any cycles in GPUs 122(1) and 122(3) that are not being consumed to render pixels for monitors 1110 and 1130 can be used to provide distributed rendering support to GPUs 122(0) and 122(2). For instance, in FIG. 11, link 304 is configured to deliver pixels from GPU 122(3) to GPU 122(0) while link 302 is configured to deliver pixels from GPU 122(1) to GPU 122(2); links 301 and 303 are idle.

Whether GPU 122(0) or GPU 122(2) in the configuration of FIG. 11 benefits from distributed rendering support depends in part on the particular programs being executed in the various GPUs. For instance, if GPU 122(1) is supporting a graphics-intensive application, it might not be beneficial to divert processing cycles in GPU 122(1) to support GPU 122(2). In addition, some applications benefit more than others from distributed rendering. Consequently, in some instances it may be more efficient not to use distributed rendering in the configuration of FIG. 11, but if a benefit can be gained, subsystem 300 can support distributed rendering.

It will be appreciated that the configurations for subsystem 300 described herein are illustrative and that variations and modifications are possible. Each GPU can be connected to any number of monitors (up to the applicable hardware limit), and the degree to which advantage is gained from distributed rendering depends in part on the number of monitors and in part on the particular rendering operations being executed for various monitors. If a user moves, adds, or removes a monitor, the links in subsystem 300 can automatically be reconfigured to support the new arrangement, and this reconfiguration can be transparent to the user. As used herein, "monitor" refers generally to any device capable of producing a visible image in response to pixel data, including but not limited to conventional technologies such as LCD, CRT, plasma, and projection.

Unidirectional Ring Connection Topology

While a bidirectional ring topology such as that shown in FIG. 3 provides maximum flexibility in configuring the connections, unidirectional ring topologies also provide certain advantages over conventional daisy chain topologies.

Figure 12:
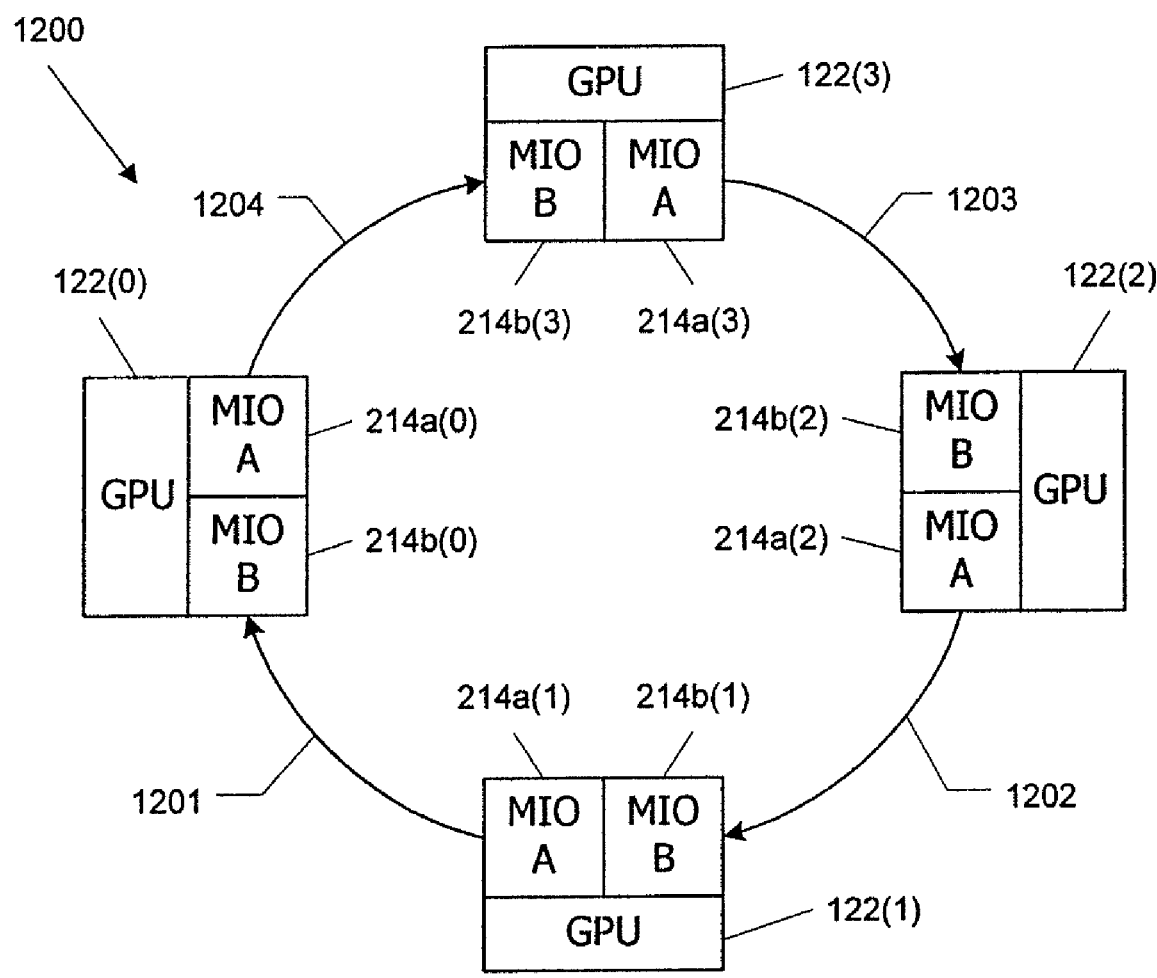
FIG. 12 illustrates a graphics subsystem with four graphics processors connected in a unidirectional ring topology according to an embodiment of the present invention.
Figure 13A:
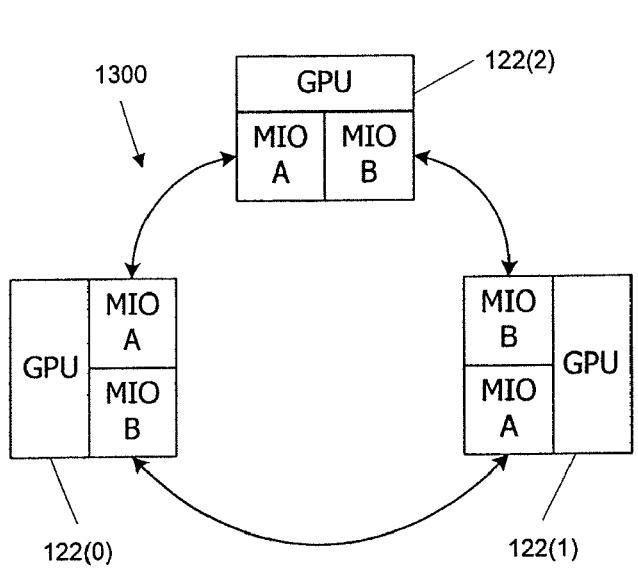
FIG. 13A illustrates a graphics subsystem with three graphics processors connected in a bidirectional ring topology according to an embodiment of the present invention.

FIG. 12 illustrates a graphics subsystem 1200 with four GPUs 122 connected in a unidirectional ring topology according to an embodiment of the present invention. It is to be understood that, like other drawings herein, FIG. 13 illustrates the connection topology, not necessarily the physical arrangement of GPUs. GPU 122(0) has its MIO A port 214a(0) connected to the MIO B port 214b(3) of GPU 122(3) via a unidirectional link 1204 that carries data from GPU 122(0) to GPU 122(3). Similarly, GPU 122(3) has its MIO A port 214a(3) connected to the MIO B port 214b(2) of GPU 12(2) via a unidirectional link 1203; GPU 122(2) has its MIO A port 214a(2) connected to the MIO B port 214b(1) of GPU 122(1) via a unidirectional link 1202, and GPU 122(1) has its MIO A port 214a(1) connected to the MIO B port 214b(0) of GPU 122(0) via a unidirectional link 1201. Unidirectional links 1201-1204 can be implemented in any manner desired as long as each link 1201-1204 is capable of delivering data in one direction. (In some embodiments, the physical link might be bidirectional, but the MIO B ports might be replaced with input-only ports while the MIO A ports are replaced with output-only ports.)

In operation, master-slave relationships between adjacent GPUs are established by configuring the MIO ports and thereby configuring links 1201-1204. Each link 1201-1204 can be configured as active or idle. When the link is active, the GPU whose MIO A port is connected to the link is slaved to the GPU whose MIO B port is connected to the link. For example, GPU 122(1) can be slaved to GPU 122(0) by configuring link 1201 to be active, but GPU 122(0) in this topology cannot be (directly) slaved to GPU 122(1).

It should be noted that the techniques for detecting connection topology described above with reference to FIGS. 6 and 7 may also be applied to graphics subsystems with unidirectional links. Where it is not initially known whether a particular link is unidirectional or bidirectional, process 700 of FIG. 7 can be used to make a determination: after process 700 of FIG. 7 identifies a connection in one direction, process 700 may be repeated with appropriate modifications to determine whether the connection is also operable in the reverse direction.

Graphics subsystem 1200 supports many of the example configurations described above. Where a single monitor is connected to any one of GPUs 122 (e.g., as shown in FIGS. 8A-8B), graphics subsystem 1200 can be configured such that all four GPUs 122 can provide pixels to that monitor. Thus, configurations corresponding to the configurations shown in FIGS. 8A and 8B can be created using the unidirectional ring topology of graphics subsystem 1200.

Where two monitors are connected to two different GPUs 122 (e.g., as shown in FIGS. 9A-9C), two-way distributed rendering can sometimes be used for each monitor. For instance, a configuration corresponding to that shown in FIG. 9A can be created using the unidirectional ring topology of graphics subsystem 1200. A configuration corresponding to the configuration shown in FIG. 9C, in which three-way distributed rendering support is provided to monitor 910 while a single GPU 122(3) supports monitor 920, can also be created using the unidirectional ring topology of graphics subsystem 1200.

For more than two monitors, distributed rendering support is also sometimes possible. For instance, configurations corresponding to any of the configurations shown in FIGS. 10A, 10B and 11 could also be created using the unidirectional ring topology of graphics subsystem 1200. (In the case of FIG. 11, GPU 122(3) could provide distributed rendering support to GPU 122(2) via link 1202, while GPU 122(1) could provide distributed rendering support to GPU 122(0) via link 1201.) Other configurations can also be supported using unidirectional ring topologies.

Further Embodiments

While the invention has been described with respect to specific embodiments, one skilled in the art will recognize that numerous modifications are possible. For instance, the example subsystem described above includes four GPUs, but the invention is not limited to a particular number of GPUs. FIG. 13 illustrates a subsystem 1300 with three GPUs 122 connected in a bidirectional ring topology, and FIG. 13B illustrates a subsystem 1310 with six GPUs 122 connected in a bidirectional ring topology. Those skilled in the art will recognize that any other number of GPUs can be connected in a unidirectional or bidirectional ring topology.

Figure 13C:
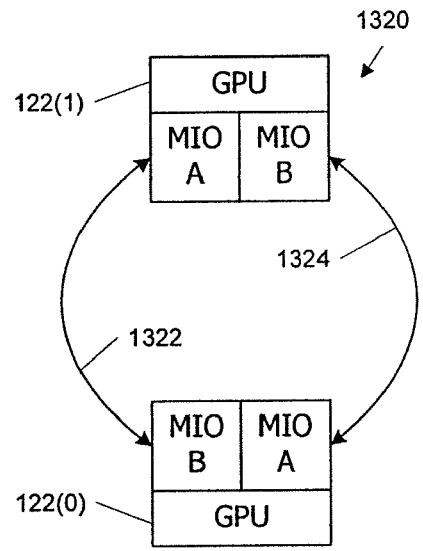
FIG. 13C illustrates a graphics subsystem with two graphics processors connected in a bidirectional ring topology according to an embodiment of the present invention.
Figure 13B:
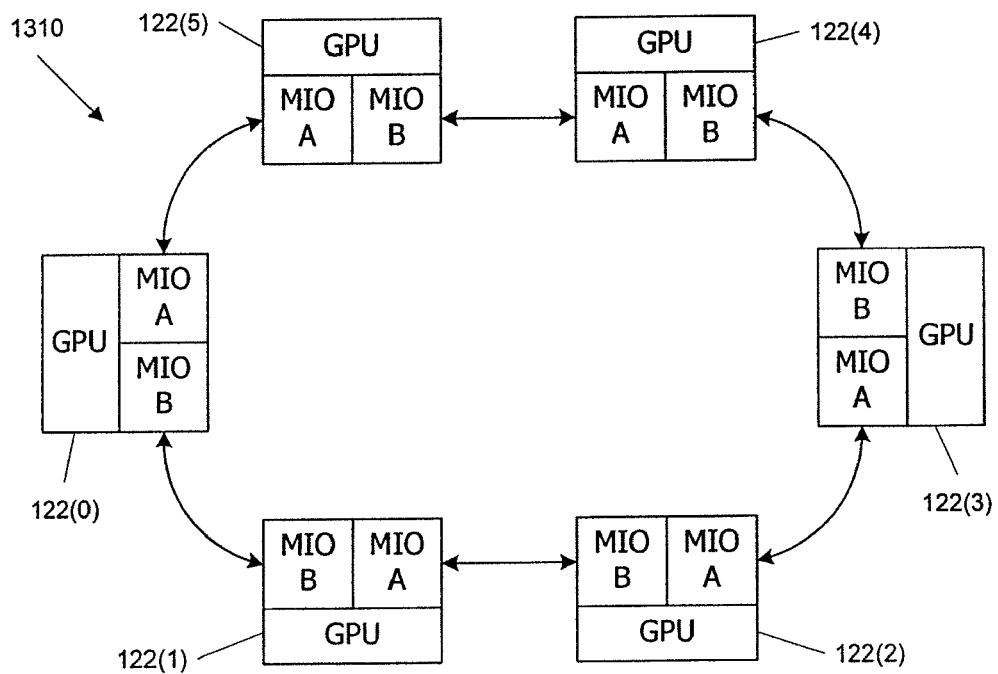
FIG. 13B illustrates a graphics subsystem with six graphics processors connected in a bidirectional ring topology according to an embodiment of the present invention.

In some cases, as shown in FIG. 13C for a subsystem 1320, two GPUs 122 can be connected to each other in a bidirectional (or unidirectional) ring topology. This arrangement can be useful, e.g., if two monitors are each to be driven using pixels from both GPUs. If one monitor is connected to each GPU, each GPU can deliver its pixels to the other GPU via one of the links. For instance, link 1322 can be configured to deliver pixels from GPU 122(1) to GPU 122(0) while link 1324 is configured to deliver pixels from GPU 122(0) to GPU 122(1). Both monitors can also be connected to the same GPU (e.g., GPU 122(0)), with each link 1322, 1324 being used to deliver pixel data to one of the two display heads of GPU 122(0).

The labeling of MIO ports and display heads herein as "A" and "B" herein is solely for convenience of description. It is to be understood that any MIO port can be connected to any other MIO port, and either display head can drive either MIO port when that port is configured as an output port. In addition some GPUs may include more than two MIO ports and/or more than two display heads.

In some embodiments, the MIO ports are also reconfigurable for purposes other than communicating with another GPU, as noted above. For instance, the MIO ports can be configured to communicate with various external devices such as TV encoders or the like; in some embodiments, DVO (Intel Corporation's Digital Video Output Interface) or other standards for video output can be supported. In some embodiments, the configuration of each MIO port is determined when a graphics adapter is assembled; at system startup, the adapter notifies the system as to the configuration of its MIO ports.

In general, any port or ports that enable one GPU to communicate pixel data with another GPU may be used as I/O ports to practice the present invention. For bidirectional ring embodiments, the ports advantageously support configuration of the direction in which pixel data is communicated Configuration of I/O ports, display heads, and other aspects of a graphics subsystem may be accomplished by a system setup unit configured to communicate with all of the graphics processors. In some embodiments, the system setup unit is implemented in a graphics driver program that executes on a CPU of a system that includes a multi-processor graphics subsystem. Any other suitable agent, including any combination of hardware and/or software components, may be used as a system setup unit.

Thus, although the invention has been described with respect to specific embodiments, it will be appreciated that the invention is intended to cover all modifications and equivalents within the scope of the following claims.

What is claimed is:

1. A graphics processor comprising:
a test pixel source configured to supply a sequence of test pixels during a test operation;
an input port configured to receive a sequence of external pixels from another graphics processor;
a pixel selection logic circuit coupled to the input port and the test pixel source, the pixel selection logic circuit being configured to select the sequence of external pixels or the sequence of test pixels as a sequence of output pixels during the test operation;
a pattern detection circuit coupled to the pixel selection logic circuit and configured to detect whether, when the sequence of external pixels is selected by the pixel selection logic during the test operation, the sequence of selected output pixels corresponds to the sequence of test pixels; and
an output port coupled to the pixel selection logic circuit and configured to deliver the sequence of selected output pixels to another graphics processor,
wherein the test operation is usable to determine whether the input port or the output port is connected to another graphics processor, and
wherein the graphics processor is further configured to perform the following during a first test operation:
output the sequence of test pixels to a second graphics processor operating in a pass-through mode such that the second graphics processor outputs via a first output port of the second graphics processor pixel data received via a first input port of the second graphics processor;
determine whether the second graphics processor outputs the sequence of test pixels while operating in the pass-through mode; and
detect a connection between the graphics processor and the second graphics processor in the event that the second graphics processor outputs the test patter while operating in pass-through mode.

2. The graphics processor of claim 1 wherein:
during a first test operation to determine whether the input port is connected to another graphics processor, the pixel selection logic circuit selects the sequence of external pixels; and
during the second test operation to determine whether the output port is connected to another graphics processor, the pixel selection logic circuit selects the sequence of test pixels.

3. The graphics processor of claim 1 wherein the pattern detection circuit includes a cyclic redundancy check circuit configured compute a checksum of the sequence of selected output pixels.

4. The graphics processor of claim 1 further comprising:
a display pipeline configured to generate a sequence of internal pixels,
wherein the pixel selection logic circuit is further configured to select between a pixel in the sequence of internal pixels and a pixel in the sequence of external pixels during an operation other than the test operation.

5. A graphics subsystem comprising:
a plurality of graphics processors, each of the graphics processors including:
a test pixel source configured to supply a sequence of test pixels of a test pattern during a test operation;
an input port configured to receive a sequence of external pixels from another one of the graphics processors;
a pixel selection logic circuit coupled to the input port and the test pixel source, the pixel selection logic circuit being configured to select the sequence of external pixels or the sequence of test pixels as a sequence of output pixels during the test operation;
a pattern detection circuit coupled to the pixel selection logic circuit and configured to detect whether the sequence of selected output pixels corresponds to the sequence of test pixels; and
an output port coupled to the pixel selection logic circuit and configured to deliver the sequence of selected output pixels to another one of the graphics processors; and
control logic configured to control the pixel selection logic circuits in each of the graphics processors,
the control logic being configured such that during the test operation, the pixel selection logic circuit of a first one of the graphics processors selects the sequence of test pixels and the pixel selection logic circuit of a second one of the graphics processors selects the sequence of external pixels,
wherein a connection between the first graphics processor and the second graphics processor is detected in the event that during the test operation, the pattern detection circuit of the second graphics processor detects that the sequence of selected output pixels corresponds to the sequence of test pixels, wherein detecting the connection during test operation further comprises:
outputting the sequence of test pixels to the second graphics processor, the second graphics processor being operating in a pass-through mode such that the second graphics processor outputs pixel data received via a first input port of the second graphics processor via a first output port of the second graphics processor;
determining whether the second graphics processor outputs the sequence of test pixels while operating in the pass-through mode; and
detecting a connection between the graphics processor and the second graphics processor in the event that the second graphics processor outputs the test patter while operating in pass-through mode.

6. The graphics subsystem of claim 5 wherein the pattern detection circuit includes a cyclic redundancy check circuit configured compute a checksum of the sequence of selected output pixels.

7. The graphics subsystem of claim 5 further comprising:
a display pipeline configured to generate a sequence of internal pixels,
wherein the pixel selection logic circuit is further configured to select between a pixel in the sequence of internal pixels and a pixel in the sequence of external pixels during a normal mode of operation.

8. The graphics subsystem of claim 5 wherein at least one of the input ports is a reconfigurable input/output (I/O) port that is configured for operation as an input port.

9. The graphics subsystem of claim 5 wherein at least one of the output ports is a reconfigurable input/output (I/O) port that is configured for operation as an output port.

* * * * *